United States Patent
Kikuchi et al.

(10) Patent No.: US 7,241,532 B2
(45) Date of Patent: Jul. 10, 2007

(54) POSITIVE-ELECTRODE MATERIAL FOR LITHIUM SECONDARY BATTERY, SECONDARY BATTERY EMPLOYING THE SAME, AND PROCESS FOR PRODUCING POSITIVE-ELECTRODE MATERIAL FOR LITHIUM SECONDARY BATTERY

(75) Inventors: Kazuhiro Kikuchi, Kanagawa (JP); Koji Shima, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/950,520

(22) Filed: Sep. 28, 2004

(65) Prior Publication Data

US 2005/0106463 A1    May 19, 2005

Related U.S. Application Data

(63) Continuation of application No. PCT/JP03/03357, filed on Mar. 19, 2003.

(30) Foreign Application Priority Data

Mar. 28, 2002    (JP)    .................... P.2002-091473

(51) Int. Cl.
*H01M 4/50*    (2006.01)
*H01M 4/52*    (2006.01)
*C01G 29/00*    (2006.01)
*C01B 35/10*    (2006.01)

(52) U.S. Cl. ................ 429/231.1; 423/277; 423/594.4; 423/594.7

(58) Field of Classification Search .............. None
See application file for complete search history.

(56) References Cited

U.S. PATENT DOCUMENTS 6,183,908 B1 *  2/2001  Miyasaka et al. ........ 429/218.1
6,383,235 B1 *  5/2002  Maegawa et al. .......... 29/623.5

FOREIGN PATENT DOCUMENTS

| CN | 1264927 | | 8/2000 |
|---|---|---|---|
| JP | 10-316431 | A | 12/1998 |
| JP | 11-16566 | A | 1/1999 |
| JP | 11-040154 | * | 2/1999 |
| JP | 2000-48820 | A | 2/2000 |
| JP | 3195175 | B2 | 6/2001 |
| JP | 2001-185146 | * | 7/2001 |
| JP | 2001-185146 | A | 7/2001 |

OTHER PUBLICATIONS

Ying et al, *Journal of Power Sources*, 102 (2001) pp. 162-166.

* cited by examiner

*Primary Examiner*—Jonathan Crepeau
(74) *Attorney, Agent, or Firm*—Oblon, Spivak, McClelland, Maier & Neustadt, P.C.

(57) ABSTRACT

A subject for the invention is to provide a positive-electrode material, which has high capacity and high output and is inhibited from suffering a decrease in output with repetitions of charge and use.

The invention provides a positive-electrode material for lithium secondary battery, which comprises a secondary particle of a lithium/transition metal composite oxide containing boron and/or bismuth, and wherein the atomic ratio of the sum of boron and bismuth to the sum of the metallic elements other than lithium, boron, and bismuth in a surface part of the secondary particle is from 5 times to 70 times the atomic ratio in the whole secondary particle.

18 Claims, No Drawings

POSITIVE-ELECTRODE MATERIAL FOR LITHIUM SECONDARY BATTERY, SECONDARY BATTERY EMPLOYING THE SAME, AND PROCESS FOR PRODUCING POSITIVE-ELECTRODE MATERIAL FOR LITHIUM SECONDARY BATTERY

This application is a continuation of International application PCT/JP03/03357, filed Mar. 19, 2003.

FIELD OF THE INVENTION

The present invention relates to a positive-electrode material for lithium secondary battery, which comprises a lithium/transition metal composite oxide. The invention further relates to a process for producing the positive-electrode material for lithium secondary battery and a secondary battery employing the positive-electrode material for lithium secondary battery.

BACKGROUND ART

With the recent trend toward size and weight reduction in portable electronic appliances and communication appliances, there is a desire for secondary battery having a high output and a high energy density to be used as a power source for these appliances. Secondary battery having such features is desired also for use as automotive power sources. In particular, lithium secondary battery is being rapidly developed because they satisfy those requirements.

As positive-electrode materials for lithium secondary battery are used lithium/transition metal composite oxides the standard compositions of which are $LiCoO_2$, $LiNiO_2$, $LiMn_2O_4$, and the like. However, various investigations are being made in order to improve battery characteristics.

For example, patent document 1 discloses that displacing part of the cobalt in $LiCoO_2$ by boron or bismuth improves charge/discharge cycle characteristics, while patent document 2 discloses that coating the surface of primary particles of $LiCoO_2$ with boron improves charge/discharge cycle characteristics. Furthermore, patent document 3 discloses that when an element Z (Bi, B, or W) is added to $LiMO_2$ (wherein M is Co, Ni, etc.) in such an amount as to result in an atomic ratio (Z/M) of 0.1 or lower and this mixture is burned, then the element Z melts at the boundaries among primary particles to thereby increase the size of the primary particles, and that use of the resultant composite oxide as a positive-electrode material brings about an improved discharge capacity.

On the other hand, of the lithium/transition metal composite oxides mentioned above, $LiMn_2O_4$ and $LiNiO_2$ are advantageous because they are less expensive than $LiCoO_2$. However, for putting these composite oxides to practical use, it is necessary to improve the composite oxides in high-temperature cycle characteristics, storability, atmosphere control during burning/storage, safety, etc. Investigations are hence being made on $LiNi_{1-x}Mn_xO_2$ obtained by displacing part of the nickel sites in $LiNiO_2$ by manganese. (e.g., non-patent documents 1 to 3) However, there is a problem that when the manganese displacement amount is increased, a sufficient capacity cannot be obtained.

[Patent Document 1] JP-A-4-253162
[Patent Document 2] JP-A-4-328258
[Patent Document 3] JP-A-8-55624
[Non-patent Document 1] *J. Mater. Chem.*, 6(1996), p. 1149
[Non-patent Document 2] *J. Electrochem. Soc.*, 145(1998), p. 1113
[Non-patent Document 3] *Dai 41-kai Denchi Tôrôn-kai Yokô-shû* (2000), p. 460

Lithium batteries are recently required more and more to have higher performances. Properties including high capacity, high output, and inhibition of output from decreasing with repetitions of charge/discharge and use are desired to be attained in a high degree. Especially for high capacity, a positive-electrode material having a high bulk density is desired.

However, the positive-electrode material disclosed in patent document 2, which is a material obtained by coating the surface of primary particles of $LiCoO_2$ with boron, is ineffective in sufficiently inhibiting the output decrease which occurs with repetitions of charge/discharge and use. In the case of the positive-electrode materials disclosed in Examples given in patent documents 1 and 3, not only an increased capacity is difficult to attain because the electrode materials have a low bulk density, but also the output decrease which occurs with repetitions of charge/discharge and use cannot be sufficiently inhibited.

DISCLOSURE OF THE INVENTION

The present inventor made intensive investigations in view of the problems described above. As a result, the following has been found. A lithium/transition metal composite oxide which comprises boron and/or bismuth and is in the form of secondary particle and in which boron and bismuth are present in a higher concentration in a surface part of the secondary particle as compared with the composition of the whole particles has a high bulk density and a small specific surface area. Because of these properties, a high capacity is attained when this composite oxide is used as a positive-electrode material. Furthermore, use of this composite material as a positive-electrode material reduces electrode resistance and, as a result, can heighten cell output. The invention has been completed based on this finding.

An essential point of the invention resides in a positive-electrode material for lithium secondary battery, which comprises a secondary particle of a lithium/transition metal composite oxide containing boron and/or bismuth, and wherein the atomic ratio of the sum of boron and bismuth to the sum of the metallic elements other than lithium, boron, and bismuth in a surface part of the secondary particle is from 5 times to 70 times the atomic ratio in the whole secondary particle.

BEST MODE FOR CARRYING OUT THE INVENTION

The invention will be explained below in detail.

Examples of the lithium/transition metal composite oxide containing boron and/or bismuth, which constitutes the positive-electrode material for lithium secondary battery according to the invention, include lithium/transition metal oxides having a lamellar structure, lithium/transition metal composite oxides having a spinel structure, and the like which each contain boron and/or bismuth. Preferred of these is a lithium/transition metal composite oxide which contains lithium in an amount exceeding the stoichiometric proportion thereof in the composite oxide and has a composition in which the atomic ratio (b/a) between the excess lithium (a) and the sum of boron and bismuth (b) satisfies $0.1 \leq b/a \leq 5$, especially $0.1 \leq b/a \leq 4$. Although the reasons for this are unclear, it is thought that the boron and/or bismuth present in a higher concentration in the surface of the secondary particle is in the form of a composite compound with lithium and this relates to the preference of that composite oxide.

The term "stoichiometric proportion in a lithium/transition metal composite oxide" means the numeral indicating the molar proportion.

For example, in the case of a composite oxide obtained by incorporating bismuth and/or boron into a lithium/transition metal composite oxide having a lamellar structure, which is represented by $LiMn_2O_4$, $LiNiO_2$, $LiCoO_2$, and the like, the composition thereof is shown by formula (4). Since the stoichiometric proportion of lithium in this lithium/transition metal composite oxide of a lamellar structure is 1, the amount of excess lithium (a), i.e., that part of the lithium amount, which is outside the stoichiometric proportion, is determined by x−1. The sum of boron and bismuth (b) is determined by v+w.

$$Li_xMBi_vB_wO_2 \quad (4)$$

(In the formula, M represents a transition metal.)

In the case of a composite oxide obtained by incorporating bismuth and/or boron into a lithium/transition metal composite oxide having a spinel structure, which is represented by $LiMn_2O_4$, the composition thereof is shown by formula (5). Since the stoichiometric proportion of lithium in this lithium/transition metal composite oxide of a spinel structure also is 1, the amount of excess lithium (a), i.e., that part of the lithium amount, which is outside the stoichiometric proportion, is determined by x−1. The sum of boron and bismuth (b) is determined by v+w.

$$Li_xM_2Bi_vB_wO_4 \quad (5)$$

(In the formula, M represents a transition metal.)

The lithium/transition metal composite oxide containing boron and/or bismuth preferably is one represented by the following formula (1).

$$Li_xM_yBi_vB_wO_2 \quad (1)$$

In formula (1), M represents at least one element selected from transition metals, alkali metals, alkaline earth metals, halogen elements, and chalcogen elements. Preferred of these are one or more elements selected from Ni, Mn, Co, Al, Fe, Ga, Sn, V, Cr, Cu, Zn, Mg, Ti, Ge, Nb, Ta, Zr, and Ca. More preferred is Ni, Mn, or Co.

In formula (1), x is a number satisfying $0<x\leq1.2$, preferably $0<x\leq1.15$. In case where x is too large, there is the possibility that the crystal structure might become unstable and that the lithium secondary battery employing this composite oxide might have a reduced battery capacity. Symbol y is a number of generally from 0.9 to 1.1, preferably from 0.95 to 1.05. Symbols v and w each are 0 or larger, preferably 0.001 or larger, more preferably 0.002 or larger, especially preferably 0.005 or larger. With respect to the upper limit, v and w are 0.1 or smaller, preferably 0.05 or smaller, more preferably 0.03 or smaller, especially preferably 0.02 or smaller. In case where v and w are too small, the effects of the invention are not produced. In case where v and w are too large, there is the possibility that battery performances might be impaired.

One of v and w may be 0. The sum of v and w is larger than 0, preferably 0.001 or larger, more preferably 0.002 or larger. The sum thereof is generally 0.2 or smaller, preferably 0.15 or smaller, more preferably 0.1 or smaller.

In the composition represented by formula (1), the oxygen amount may be slightly nonstoichiometric.

Preferred of the composite oxides represented by formula (1) are ones represented by the following formula (2).

$$Li_xM^1_{y1}M^2_{y2}Bi_vB_wO_2 \quad (2)$$

In formula (2), $M^1$ represents at least one element selected from Ni, Mn, and Co. $M^1$ may be of one kind or a combination of two or more kinds. $M^2$ represents at least one element selected from Ni, Mn, Co, Al, Fe, Ga, Sn, V, Cr, Cu, Zn, Mg, Ti, Ge, Nb, Ta, Zr, and Ca (the at least one element is often referred to as "displacing metallic element"). Preferred examples of M are Al, Co, Fe, Mg, Ga, Ti, and Ca. $M_2$ preferably is Al, Co, or Mg, especially Al or Co, more preferably Co. $M^2$ may be of one kind or a combination of two or more kinds.

In formula (2), x, v, and w are the same as in formula (1). Symbols y1 and y2 are numbers satisfying $0<y1$ and $0\leq y2$, provided that y1+y2 is generally from 0.9 to 1.1, preferably from 0.95 to 1.05.

In the composition represented by formula (2), the oxygen amount may be slightly nonstoichiometric.

Preferred of the lithium/transition metal composite oxides containing boron and/or bismuth, which are represented by, formula (2) is a composite oxide represented by the following formula (3), which has a lamellar crystal structure and contains lithium, nickel, and manganese.

$$Li_xNi_\alpha Mn_\beta Q_{(1-\alpha-\beta)}Bi_vB_wO_2 \quad (3)$$

In formula (3), Q represents a metallic element which has displaced part of the Ni and Mn sites (hereinafter, such a metallic element is often referred to as "displacing metallic element"). Examples of Q include transition metals, alkali metals, alkaline earth metals, halogen elements, chalcogen elements, and the like. In particular, examples thereof include elements such as Al, Fe, Ga, Sn, V, Cr, Co, Cu, Zn, Mg, Ti, Ge, Nb, Ta, Zr, and Ca. Preferred examples of Q are Al, Co, Fe, Mg, Ga, Ti, and Ca. Q preferably is Al, Co, or Mg, especially Al or Co, more preferably Co. Q may be of one kind or a combination of two or more kinds.

In formula (3), x represents a number satisfying $0<x\leq1.2$, preferably $0<x\leq1.15$. In case where x is too large, there is the possibility that the crystal structure might become unstable and that the lithium secondary battery employing this composite oxide might have a reduced battery capacity.

Symbol α is a number generally satisfying $0.3\leq\alpha\leq0.8$, preferably $0.3\leq\alpha\leq0.7$. Symbol β is preferably 0.05 or larger, especially 0.1 or larger, and is preferably 0.6 or smaller, especially 0.45 or smaller. In case where β is too large, it is difficult to synthesize a lithium-nickel-manganese composite oxide of a single-phase structure. Conversely, in case where α is too large, not only the total cost is increased but also the effects of the invention are not markedly produced.

The Ni/Mn molar ratio, α/β is 0.7 or higher, preferably 0.8 or higher, especially preferably 0.9 or higher, and is 9 or lower, preferably 8 or lower, especially preferably 6 or lower.

The value of (1−α−β) is 0 or larger, and is 0.5 or smaller, preferably 0.4 or smaller, more preferably 0.3 or smaller. Too high contents of the displacing metallic element Q are impracticable because this composite oxide gives a cell electrode having a reduced capacity and because it is necessary to use a large amount of an expensive raw material the resources for which are not abundant, especially when the transition metal element Q is cobalt.

Symbols v and w each are 0 or larger, preferably 0.001 or larger, more preferably 0.002 or larger, especially preferably 0.005 or larger. With respect to the upper limit, v and w are 0.05 or smaller, preferably 0.03 or smaller, more preferably 0.02 or smaller. In case where v and w are too small, the effects of the invention are not produced. In case where v and w are too large, there is the possibility that cell electrode performances might be impaired. One of v and w may be 0.

The sum of v and w is larger than 0, preferably 0.001 or larger, more preferably 0.002 or larger. The sum thereof is generally 0.2 or smaller, preferably 0.15 or smaller, more preferably 0.1 or smaller.

In the composition represented by formula (3), the oxygen amount may be slightly nonstoichiometric.

The lithium/transition metal composite oxide containing boron and/or bismuth is in the form of secondary particle. These secondary particle show a single crystal phase and are characterized in that bismuth and boron are present in a higher concentration in a surface part of the particles. Specifically, the atomic ratio of the sum of boron and bismuth to the sum of the metallic elements other than lithium, boron, and bismuth in a surface part of the secondary particle is from 5 times to 70 times the atomic ratio of the sum of boron and bismuth to the sum of the metallic elements other than lithium, boron, and bismuth in the whole secondary particle. This proportion preferably is 8 times or more, and is preferably up to 60 times, especially up to 50 times. In case where this proportion is too small, the effect of improving battery performances is low. Conversely, too large values of this proportion lead to impaired battery performances and deterioration in powder properties including bulk density.

Compositional analysis of a surface part of the secondary particle is conducted by X-ray photoelectron spectroscopy (XPS) using AlK as an X-ray source under the conditions of an analysis area of 0.8 mm in diameter and a takeout angle of 45 degrees. Although the range (depth) in which analysis is possible varies depending on the composition of the secondary particle, it is generally from 0.1 nm to 50 nm. Especially in positive-electrode materials, that range is generally from 1 nm to 10 nm. Consequently, the term "surface part of secondary particle" as used in the invention means the range in which analysis is possible under those conditions.

The average particle diameter (average secondary-particle diameter) of these secondary particles is generally 1 μm or larger, preferably 4 μm or larger, and is generally 50 μm or smaller, preferably 40 μm or smaller. Average secondary-particle diameters can be measured with a known laser diffraction/scattering type particle size distribution analyzer. Examples of dispersion media for use in this measurement include 0.1% by weight aqueous sodium hexametaphosphate solution. The particle diameter of the secondary particle can be regulated, for example, by changing production conditions such as, e.g., spraying conditions including gas/liquid ratio in the spray drying step which will be described later. In case where the particle diameter of the secondary particle is too small, cycle characteristics and safety tend to decrease. In case where the particle diameter thereof is too large, internal resistance tends to become high and sufficient output is less apt to be obtained.

The primary particles constituting the secondary particle have an average particle diameter (average primary-particle diameter) of generally 0.01 μm or larger, preferably 0.02 μm or larger, more preferably 0.1 μm or larger. The primary-particle diameter is generally 10 μm or smaller, preferably 5 μm or smaller, more preferably 3 μm or smaller. Average primary-particle diameters can be measured through an examination with a scanning electron microscope (SEM). The size of the primary particles can be regulated by changing, for example, production conditions such as, e.g., burning temperature, burning period, and burning atmosphere. In case where the primary-particle diameter is too small, side reactions and the like are apt to take place on the surface and, hence, cycle characteristics and other performances are apt to decrease. In case where the primary-particle diameter is too large, rate characteristics and capacity tend to decrease due to the inhibition of lithium diffusion, condition passage deficiency, etc.

The specific surface area of the secondary particle consisting of a lithium/transition metal composite oxide containing boron and/or bismuth cannot be unconditionally specified because it varies considerably depending on the composition and on the elements contained. However, the specific surface area thereof is generally 0.1 $m^2/g$ or larger, preferably $0.2 m^2/g$ or larger, more preferably 0.3 $m^2/g$ or larger. Too small a specific surface area is undesirable because it means that the primary-particle diameter is large, i.e., rate characteristics and capacity tend to decrease. On the other hand, too large specific surface areas also tend to result in a decrease in cycle characteristics, etc. Because of these, the specific surface area thereof is generally 8 $m^2/g$ or smaller, preferably 5 $m^2/g$ or smaller, more preferably 2 $m^2/g$ or smaller.

Specific surface areas are measured with a known BET type specific surface area meter for powders. Specifically, a BET one-point measurement is made by the continuous flow method using nitrogen and helium as an adsorbate gas and a carrier gas, respectively. First, a powder sample is heated and degassed at a temperature of 450° C. or lower with a mixed gas and subsequently cooled to a liquid-nitrogen temperature to adsorb a helium/nitrogen mixed gas thereonto. This sample is heated to room temperature with water to desorb the adsorbed nitrogen gas. The nitrogen gas being desorbed is detected with a thermal conductivity detector. The amount of the desorbed gas corresponding to a desorption peak is determined, and the specific surface area of the sample is calculated therefrom.

The tap density of the secondary particle according to the invention, which consist of a lithium/transition metal composite oxide containing boron and/or bismuth, is measured by a method comprising placing about 8 g of the lithium/transition metal composite oxide powder in a 10-mL measuring cylinder, tapping (dropping) the cylinder 200 times, and measuring the density. The height from which the measuring cylinder is dropped is from 1 to 5 cm. The material of the receiving surface onto which the measuring cylinder is dropped is not particularly limited. The dropping interval is from 50 to 500 drops per minute. The tap density of the particles cannot be unconditionally specified because it varies considerably depending on the composition and the elements contained. However, the tap density thereof is generally 0.8 $g/cm^3$ or higher, preferably 1.6 $g/cm^3$ or higher, more preferably 1.8 $g/cm^3$ or higher, most preferably 2.0 $g/cm^3$ or higher. In case where the tap density thereof is too low, the amount of the positive-electrode material per unit volume is small and this necessitates an increased battery volume for securing a certain energy capacity in fabricating a secondary battery. In addition, low tap densities necessarily result in a low energy capacity when a battery having a reduced size is to be produced. Consequently, the higher the tap density, the more the particles are preferred. However, the tap density of the particles is practically 3.0 $g/cm^3$ or lower, generally 2.5 $g/cm^3$ or lower.

The secondary particle consisting of a lithium/transition metal composite oxide containing boron and/or bismuth can be produced by: forming into particles a raw-material mixture which comprises compounds containing the metallic elements to be components of the target lithium/transition metal composite oxide and further containing boron and/or bismuth; and then burning this molding at a temperature higher than the melting points of the boron compound and bismuth compound used as raw materials.

As the raw materials can usually be used various compounds of the elements shown above, such as oxides, inorganic salts, e.g., carbonates, sulfates, nitrates, and phosphates, halides, and organic salts.

Examples of compounds containing lithium include inorganic lithium salts such as $Li_2CO_3$, $LiNO_3$, and lithium acetate; lithium hydroxides such as LiOH and $LiOH.H_2O$; lithium halides such as LiCl and LiI; inorganic lithium compounds such as $Li_2O$; organic lithium compounds such as alkyllithiums and fatty acid lithiums; and the like. Lithium compounds soluble in solvents may also be used. Preferred of these are $Li_2CO_3$, $LiNO_3$, $LiOH.H_2O$, and lithium acetate. In the case where raw materials are mixed by a wet process, it is preferred to use $LiOH.H_2O$. When water is used as a dispersion medium, $LiOH.H_2O$ shows an improved diffusion efficiency and improved homogeneity in the dispersion medium because it is water-soluble. In addition, since $LiOH.H_2O$ is a compound containing no elements such as nitrogen and sulfur, use of it has an advantage that harmful substances such as $NO_x$ and $SO_x$ do not generate therefrom during burning. Those lithium compounds may be used alone or in combination of two or more thereof.

Examples of compounds containing nickel include $Ni(OH)_2$, NiO, NiOOH, $NiCO_3.2Ni(OH)_2.4H_2O$, $NiC_2O_4.2H_2O$, $Ni(NO_3)_2.6H_2O$, $NiSO_4$, $NiSO_4.6H_2O$, fatty acid nickels, nickel halides, and the like. Preferred of these are the compounds containing no elements such as nitrogen and sulfur, e.g., $Ni(OH)_2$, NiO, NiOOH, $NiCO_3.2Ni(OH)_2.4H_2O$, and $NiC_2O_4.2H_2O$. This is because use of such a compound does not result in the generation of harmful substances such as $NO_x$ and $SO_x$ therefrom during a burning step. Especially preferred are $Ni(OH)_2$, NiO, and NiOOH from the standpoints of easy availability as an industrial raw material and of high reactivity in burning. Those nickel compounds may be used alone or in combination of two or more thereof.

Examples of compounds containing manganese include $Mn_3O_4$, $Mn_2O_3$, $MnO_2$, MnOOH, $MnCO_3$, $Mn(NO_3)_2$, $MnSO_4$, organomanganese compounds, manganese hydroxides, manganese halides, and the like. Preferred of these manganese compounds are $Mn_2O_3$, $MnO_2$, and $Mn_3O_4$ because they have valences close to the manganese oxidation number for the final target composite oxide.

Examples of compounds containing boron include boric acid, boron, boron halides, boron carbide, boron nitride, boron oxide, organic complexes of boron halides, organoboron compounds, alkylboric acids, boranes, and the like. Any of these can be used as long as it is either a boron compound having a melting point lower than the burning temperature to be used in producing the lithium/transition metal composite oxide containing boron and/or bismuth or a boron compound which yields such boron compound. However, boric acid and boron oxide are preferred of those boron compounds from the standpoints of easy availability as an industrial raw material and of satisfactory handleability. Those boron compounds may be used alone or in combination of two or more thereof.

Examples of compounds containing bismuth include bismuth metal, bismuth oxides, bismuth halides, bismuth carbide, bismuth nitride, bismuth hydroxide, bismuth chalcogenides, bismuth sulfate, bismuth nitrate, and organobismuth compounds. Any of these can be used as long as it is either a bismuth compound having a melting point lower than the burning temperature to be used in producing the lithium/transition metal composite oxide containing boron and/or bismuth or a bismuth compound which yields such bismuth compound. However, bismuth oxides are preferred of those bismuth compounds from the standpoints of easy availability as an industrial raw material and of satisfactory handleability. Especially preferred is $Bi_2O_3$. Those bismuth compounds may be used alone or in combination of two or more thereof.

The proportions of those raw materials to be mixed are suitably selected according to the composition of the target lithium/transition metal composite oxide containing boron and/or bismuth.

The amounts of boron and bismuth maybe suitably regulated while taking account of deficiencies caused by, e.g., volatilization during synthesis and of inclusion of the elements as impurities from raw materials. Specifically, however, it is preferred that the molar proportion of bismuth (v) to be present in the reaction system be in the range of generally $0 \leq v \leq 0.2$, preferably $0 \leq v \leq 0.1$, especially $0 \leq v \leq 0.05$. Likewise, it is preferred that the molar proportion of boron (w) to be present in the reaction system be in the range of generally $0 \leq w \leq 0.2$, preferably $0 \leq w \leq 0.1$, especially $0 \leq w \leq 0.05$. It is also preferred to mix raw materials in such proportions that the atomic ratio (b/a) between the excess lithium (a), i.e., that part of the lithium amount which is outside the stoichiometric proportion in the lithium/transition metal composite oxide, and the sum of boron and bismuth (b) is in the range of $0.15 < b/a \leq 5$. This is because secondary particle having a high bulk density can be easily produced from such a raw-material mixture.

Methods for mixing raw materials are not particularly limited, and either a wet process or a dry process may be used. Examples thereof include methods using apparatus such as a ball mill, oscillating mill, or bead mill. Water-soluble raw materials, e.g., lithium hydroxide, may be mixed as an aqueous solution with solid raw materials. Wet mixing is preferred because more even mixing is possible and this can enhance reactivity in the later burning step.

The period of mixing cannot be unconditionally specified because it varies depending on mixing methods. Any mixing period may be used as long as the raw materials are evenly mixed on a particulate level. For example, in mixing with a ball mill (wet or dry mixing), the period is generally about from 1 hour to 2 days. In mixing with a bead mill (wet continuous process), the convection time is generally about from 0.1 hour to 6 hours.

With respect to the degree of pulverization, the particle diameter of the raw-material particles is an index thereto. The particle diameter thereof is regulated to generally 2 μm or smaller, preferably 1 μm or smaller, more preferably 0.5 μm or smaller. In case where the solid matter in the dispersion medium containing raw materials in wet mixing (hereinafter this dispersion medium is often referred to as slurry) has too large an average particle diameter, not only reactivity in a burning step is reduced, but also the spray drying which will be described later tends to yield dry particles having reduced sphericity, resulting in a reduced final particle packing density. This tendency is pronounced especially when particles of 50 μm or smaller in average particle diameter are to be produced. Furthermore, to produce particles of an unnecessarily reduced size leads to an increased pulverization cost. Because of these, the average particle diameter of the solid matter in the slurry is generally 0.01 μm or larger, preferably 0.02 μm or larger, more preferably 0.1 μm or larger.

The raw-material mixture is formed into particles. Methods for producing a particulate material are not particularly limited as long as a particulate material can be obtained which comprises compounds containing the metallic elements to be components of the target lithium/transition metal composite oxide and further containing boron and/or bismuth. For example, the particulate material can be obtained by: a method in which a wet-process mixture of raw materials is spray-dried; a method in which a precipitate is yielded from an aqueous solution of raw materials by coprecipitation and this precipitate is dried; a method in which a dry-process mixture of raw materials is formed into particles using a small amount of water or a binder; or the like. Spray drying is preferred from the standpoints of the uniformity, powder flowability, and powder handleability of the particulate material yielded, the ability to efficiently form secondary particle, etc. Examples thereof include: a method in which particles comprising a compound containing lithium and a compound containing a transition metal are produced by spray drying and these particles are mixed by a dry process with a compound containing boron and/or a compound containing bismuth; a method in which a particulate material is produced by spray drying from a slurry containing a compound containing lithium, a compound containing a transition metal, and a compound containing boron and/or compound containing bismuth; and the like.

The average particle diameter of the particulate material is preferably regulated to 50 μm or smaller, preferably 40 μm or smaller. However, too small particle diameters tend to be difficult to obtain. Consequently, the average particle diameter thereof is generally 4 μm or larger, preferably 5 μm or larger. In the case of producing a particulate material by spray drying, the particle diameter thereof can be regulated by suitably selecting a spraying mode, rate of supplying a pressurized gas flow, slurry feed rate, drying temperature, etc.

The particulate material comprising compounds containing the metallic elements to be components of the target lithium/transition metal composite oxide and further containing boron and/or bismuth is burned, whereby secondary particle formed by the sintering of primary particles can be obtained. For the burning can be used, for example, a box furnace, tube furnace, tunnel kiln, rotary kiln, or the like. The burning usually comprises three stages, i.e., heating, holding at a maximum temperature, and cooling. The second stage, i.e., holding at a maximum temperature, is not always conducted once and may be conducted in two or more steps according to purposes. The sequence of heating, holding at a maximum temperature, and cooling may be repeatedly conducted two or more times each after a disaggregation step for eliminating aggregates to such a degree as not to destroy the secondary particle or after a pulverization step for pulverizing to fine particles smaller than the primary particles or secondary particle. It is, however, noted that in the case where the pulverization step is inserted, the resultant pulverized particles are subjected, before being subsequently burned, to the step of forming secondary particle by, e.g., spray drying.

In the heating stage, the internal temperature of the furnace is elevated at a heating rate of generally from 1 to 5° C./min. Although too slow heating is industrially disadvantageous because it takes much time, too quick heating makes the internal temperature of some furnaces not to follow a set temperature.

In the stage of holding at a maximum temperature, the burning temperature is generally 500° C. or higher, preferably 600° C. or higher, more preferably 800° C. or higher. Too low temperatures tend to necessitate a prolonged burning period for obtaining a lithium/transition metal composite oxide having satisfactory crystallinity. In contrast, in case where too high a temperature is used, the lithium/transition metal composite oxide undergoes severe sintering. As a result, not only the yield in pulverization/disaggregation after the burning becomes poor, which is industrially disadvantageous, but also a lithium/transition metal composite oxide having many defects such as oxygen deficiencies is yielded. Lithium secondary battery employing this lithium/transition metal composites oxide as a positive-electrode active material may have a reduced battery capacity or deteriorate due to the collapse of the crystal structure, which proceeds with charge/discharge. Because of these, the burning temperature is generally 1,100° C. or lower, preferably 1,000° C. or lower.

The holding period in the stage of holding at a maximum temperature is selected generally from a wide range of from 1 hour to 100 hours. It is, however, preferred to use a holding period of 80 hours or shorter, especially 50 hours or shorter, for obtaining secondary particle having a high boron and/or bismuth concentration in a surface part thereof. In particular, the holding period is preferably 30 hours or shorter, especially 20 hours or shorter, more preferably 15 hours or shorter. When the burning period is too long, there are cases where boron and bismuth do not come to be present in a higher concentration in the surface of the secondary particle but come to be evenly distributed throughout the secondary particle. In case where the burning period is too short, a lithium/transition metal composite oxide having satisfactory crystallinity is difficult to obtain.

In the cooling stage, the internal temperature of the furnace is lowered at a cooling rate of generally from 0.1 to 5° C./min. Too slow cooling is industrially disadvantageous because it takes much time. Too quick cooling tends to result in poor uniformity of the target material and in accelerated deterioration of the vessel.

The lithium/transition metal composite oxide containing boron and/or bismuth according to the invention, in particular the lithium-nickel-manganese composite oxide containing boron and/or bismuth, varies in bulk density, e.g., tap density, depending on burning atmospheres. Consequently, the atmosphere for the burning preferably is an atmosphere having an oxygen concentration of from 10 to 80% by volume, more preferably from 10 to 50% by volume, such as air. When the oxygen concentration is too high, there is the possibility that the resultant lithium/transition metal composite oxide containing boron and/or bismuth might have a reduced bulk density.

In the invention, the particulate material formed is burned at a temperature higher than the melting point of the boron compound and/or bismuth compound used as raw materials. It was found that during the burning, the boron and/or bismuth contained in the particulate material melts and diffuses to the surface of the secondary particle while accelerating the sintering of the primary particles, and that the boron and/or bismuth thus comes to be finally present in a higher concentration in the surface of the secondary particle. The invention has been achieved based on this finding. Such secondary particle cannot be obtained even when a powdery mixture of raw materials is burned as it is without being formed into particles or when a molding formed by press-molding a raw-material mixture is burned.

The thus-obtained lithium/transition metal composite oxide containing boron and/or bismuth is made up of secondary particle each consisting of primary particles densely sintered together as in fusion bonding. This composite oxide hence has a higher tap density than the lithium/transition metal composite oxides according to related-art techniques. Because of this, the amount of a positive-electrode material per unit volume can be further increased.

When this composite oxide is used as a positive-electrode material for secondary battery, the energy capacity per unit cell volume can be increased and cell size reduction is also possible. In addition, the following is presumed. The secondary particle according to the invention has, formed in the surface thereof, a resistive layer containing nickel incorporated in lithium sites. With repetitions of charge/discharge, this resistive layer gradually disappears to thereby gradually reduce resistance. Thus, the resistive layer prevents output from decreasing with repetitions of charge/discharge.

The positive-electrode material according to the invention is used in the positive electrode of a lithium secondary battery. A positive electrode generally comprises a current collector and formed thereon a positive-electrode active material layer comprising a positive-electrode material, a binder, and a conductive material. The positive-electrode active material in the invention is the positive-electrode material for lithium secondary battery described above. The positive-electrode active material layer is generally obtained by a method comprising forming the constituent ingredients into a sheet and press-bonding this sheet to a current collector, a method comprising preparing a slurry containing the constituent ingredients, applying it to a current collector, and drying the coating, or another method. The positive-electrode active material layer obtained through coating and drying is preferably pressed and densified with a roller press or the like in order to heighten the packing density of the electrode material.

The proportion of the positive-electrode material in the positive-electrode active material layer is generally 10% by weight or higher, preferably 30% by weight or higher, and is generally 99.9% by weight or lower, preferably 99% by weight or lower. Too high proportions of the positive-electrode material tend to result in insufficient strength of the positive electrode. In case where the proportion thereof is too low, there is the possibility of resulting in insufficient capacity.

Examples of the conductive material for use in the positive electrode include natural graphite, artificial graphite, acetylene black, and the like. The proportion of the conductive material in the active material layer is generally 0.1% by weight or higher, preferably 1% by weight or higher, and is generally 50% by weight or lower, preferably 10% by weight or lower. Too high proportions of the conductive material may result in insufficient capacity, while too low proportions thereof may result in insufficient electrical conductivity.

Examples of the binder for use in the positive electrode include poly(vinylidene fluoride), polytetrafluoroethylene, poly (vinyl acetate), poly (methyl methacrylate), polyethylene, nitrocellulose, and the like. The proportion of the binder in the positive-electrode active material layer is generally 0.1% by weight or higher, preferably 1% by weight or higher, and is generally 60% by weight or lower, preferably 40% by weight or lower. Too high proportions thereof may result in insufficient capacity, while too low proportions thereof may result in insufficient strength.

Examples of solvents usable in preparing the slurry for use in forming the positive-electrode active material layer include N-methylpyrrolidone, tetrahydrofuran, dimethylformamide, water, and the like. Examples of the material of the positive-electrode current collector include aluminum, stainless steel, and the like. Aluminum is preferred.

The lithium secondary battery according to the invention generally has the positive electrode described above, a negative electrode, and an electrolyte.

As the negative electrode may be used one comprising a current collector and formed thereon a negative-electrode active material layer comprising a negative-electrode active material and a binder and optionally containing a conductive material. Also usable as the negative electrode is a foil of a metal such as lithium metal or a lithium alloy, e.g., a lithium-aluminum alloy.

As the negative-electrode active material is preferably used a carbon material. Examples of the carbon material include natural graphite, pyrolysis carbon, and the like. The material of the negative-electrode current collector preferably is copper. Examples of the binder and conductive material for use in the negative electrode include the same binders and conductive materials as those for use in the positive electrode. A preferred negative electrode comprises a current collector and formed thereon a negative-electrode active layer containing a carbon material.

Examples of the electrolyte include electrolytic solutions, solid electrolytes, gel-form electrolytes, and the like. Preferred are electrolytic solutions, in particular, nonaqueous electrolytic solutions. Examples of the nonaqueous electrolytic solutions include ones prepared by dissolving various electrolyte salts in nonaqueous solvents. Examples of the electrolyte salts include lithium salts such as $LiCiO_4$, $LiAsF6$, $LiPF_6$, $LiBF_4$, $LiBr$, and $LiCF_3SO_3$.

Examples of the nonaqueous solvents include tetrahydrofuran, 1,4-dioxane, dimethylformamide, acetonitrile, benzonitrile, dimethyl carbonate, diethyl carbonate, methyl ethyl carbonate, ethylene carbonate, propylene carbonate, butylene carbonate, and the like. These electrolyte salts and nonaqueous solvents may be used alone or as a mixture of two or more thereof.

A separator is generally disposed between the positive electrode and the negative electrode. Examples of the separator include microporous polymer films made of a polymer such as polytetrafluoroethylene, polyethylene, polypropylene, or a polyester, nonwoven-fabric filters made of glass fibers or the like, composite nonwoven-fabric filters made of glass fibers and polymer fibers, and the like.

EXAMPLES

The invention will be explained below in more detail by means of Examples, but the invention should not be construed as being limited to the following Examples unless the invention departs from the spirit thereof.

<Battery Evaluation>

<A. Production of Positive Electrode and Capacity Examination>

The lithium-nickel-manganese composite oxide obtained in each of the Examples and Comparative Examples which will be given later was sufficiently mixed in an amount of 75 parts by weight with 20 parts by weight of acetylene black and 5 parts by weight of a polytetrafluoroethylene powder using a mortar. This mixture was formed into a thin sheet, which was punched with 9-mm$\phi$ and 12-mm$\phi$ punches. In this operation, the sheet was regulated so that the whole disks thus punched out had weights of about 8 mg and about 18 mg, respectively. These disks were press-bonded to an expanded metal made of aluminum. Thus, positive electrodes were obtained.

A coin cell was fabricated using the positive electrode punched out in 9 mm$\phi$ as a test electrode and using lithium metal as the counter electrode. This cell was charged at a constant current of 0.2 mA/cm2 to 4.2 V (reaction for causing the positive electrode to release lithium ions) and then discharged at a constant current of 0.2 mA/cm² to 3.0 V (reaction for causing the positive electrode to occlude lithium ions). The initial charge/discharge capacity E [%] in this operation was determined using the equation E [%]=Qs(D)/Qs (C), wherein Qs (C) [mAh/g] was the initial charge capacity per unit weight of the positive-electrode active material and Qs(D) [mAh/g] was the initial discharge capacity per unit weight thereof.

<B. Production of Negative Electrode and Capacity Examination>

A graphite powder having an average particle diameter of about from 8 to 10 μm (d002 =3.35 Å) was mixed in an amount of 92.5 parts by weight with 7.5 parts by weight of poly(vinylidene fluoride). To this mixture was added N-methylpyrrolidone to prepare a slurry. This slurry was applied to one side of a copper foil having a thickness of 20 μm, and the coating was dried to remove the solvent. Thereafter, a 12-mmϕ disk was punched out thereof and pressed at 0.5 ton/cm² to produce a negative electrode.

A cell was fabricated using this negative electrode as a test electrode and lithium metal as the counter electrode. The negative electrode was caused to occlude lithium ions at a constant current of 0.5 mA/cm² until 0 V. The initial occlusion capacity per unit weight of the negative-electrode active material in this operation is expressed by Qf [mAh/g].

<C. Fabrication of Coin Cell and Battery Performance Evaluation>

The positive electrode punched out in 12 mmϕ was placed on a positive-electrode can. A porous polyethylene film having a thickness of 25 μm was placed as a separator on the positive electrode. After these components were pressed with a gasket made of polypropylene, the negative electrode was placed thereon. A spacer for thickness regulation was placed. Thereafter, a nonaqueous electrolytic solution was introduced into the coin cell and sufficiently infiltrated. A negative-electrode can was then put thereon and the coin cell was sealed.

As the nonaqueous electrolytic solution was used one prepared by dissolving lithium hexafluorophosphate ($LiPF_6$) in a concentration of 1 mol/L in a mixed solvent consisting of ethylene carbonate (EC) and diethyl carbonate (DEC) in a volume ratio of 3:7.

The balance between the weight of the positive-electrode active material and the weight of the negative-electrode active material was regulated so as to almost satisfy the following equation.

(Weight of positive-electrode active material [g])/
(weight of negative-electrode active material
[g])=(Qf [mAh/g]/1.2)/Qs(C) [mAh/g]

<D. Cycle Test>

The 1-hour-rate current value (1 C) for the cell was set as shown by the following equation, and the following measurement was made.

1 C [mA]=Qs(D)×(weight of positive-electrode
active material [g])

First, at room temperature, 2 cycles of charge/discharge at a constant current of 0.2 C and 1 cycle of charge/discharge at a constant current of 1 C were conducted. Subsequently, a test consisting of 1 cycle of charge/discharge at a constant current of 0.2 C and subsequent 100 cycles of charge/discharge at a constant current of 1 C was conducted at an elevated temperature of 60° C. The upper limit in charge was 4.1 V and the lower-limit voltage was 3.0 V.

Through this operation, the high-temperature cycle capacity retention P [%] was determined using the following equation, wherein Qh(1) was the discharge capacity for the first cycle in the test stage consisting of 100 cycles of 1-C charge/discharge at 60° C. and Qh(100) was the discharge capacity for the hundredth cycle in that stage.

P[%]={Qh(100)/Qh(1)}×100

<E. Measurement of Room-Temperature Resistance>

Conditioning current value I [mA]=(Qs(D) [mAh/
g])×(weight of positive-electrode active material
M [g])/5

The coin cell obtained was subjected to initial conditioning consisting of 2 cycles of charge/discharge at the conditioning current value I determined with the equation given above and at a charge upper-limit voltage of 4.1 V and a discharge lower-limit voltage of 3.0V. The discharge capacity QS2 (D) [mAh/g] per unit weight of the positive-electrode active material in the second cycle in this operation was measured. The value of 1 C was set based on the following equation, and the following measurement was made.

1 C [mA]=($Qs_2$(D) [mAh/g])×(weight of positive-
electrode active material M [g])

The battery was sufficiently relaxed in a 25° C. room-temperature atmosphere. Thereafter, the battery was charged at a constant current of 1/3 C [mA] for 108 minutes, allowed to stand for 1 hour, and then discharged at a constant current of 3 C for 10 seconds.

The difference ΔV [mV] between the voltage as measured after the 10-second discharge V [mV] and the voltage as measured before the discharge $V_0$[mV], i.e., V[mV]–$V_0$ [mV], was calculated. From the discharge current of 3 C [mA], the resistance R [Ω] was calculated using the equation R [Ω]=ΔV [mV]/3 C [mA] The smaller the value of this resistance R [Ω], the higher the effects of attaining excellent charge characteristics at room temperature, suitability for rapid charge, etc.

This resistance measurement was made before and after the <D. Cycle Test>to determine the values of room-temperature resistance before and after the cycle test. The change ratio between these was also determined.

Example 1

$LiOH.H_2O$, NiO, $Mn_2O_3$, $Co(OH)_2$, and $H_3BO_3$ were mixed together so as to result in Li:Ni:Mn:Co:B=1.05:0.65:0.15:0.20:0.010 (molar ratio). Pure water was added thereto to prepare a slurry having a solid concentration of 25% by weight. This slurry was treated with a circulating wet pulverizer of the medium stirring type to pulverize until the average particle diameter of the solid matter in the slurry became 0.30 μm. Thereafter, the slurry was spray-dried with a four-fluid-nozzle type spray dryer to obtain a particulate material. During the spray drying, air was used as a drying gas. The drying gas introduction rate was 1,200 L/min and the drying gas inlet temperature was 90° C.

About 8 g of the particulate material obtained by the spray drying was introduced into an alumina crucible having a diameter of 50 mm. This crucible was placed in an atmospheric burning furnace. While air was being passed at a flow rate of 9 L/min, the particulate material was heated at a heating rate of 5° C./min to a maximum temperature of 830° C., held at 830° C. for 10 hours, and then cooled at a cooling rate of 5° C./min. Thus, a lithium-nickel-manganese composite oxide (average particle diameter, 8 μm) having almost the same molar composition as in the raw materials fed was obtained. From an X-ray powder diffraction pattern, this lithium-nickel-manganese composite oxide was ascertained to have a single-phase lamellar structure.

About 5 g of the lithium-nickel-manganese composite oxide obtained was placed in a 10-mL measuring cylinder made of glass. After this measuring cylinder was tapped 200 times, the powder packing density (tap density) was measured. As a result, the density was found to be 1.89 g/cc.

This composite oxide was examined for BET specific surface area with "Fully Automatic Powder Specific Surface Area Meter, Type AMS8000" manufactured by Okura Riken. As a result, the specific surface area thereof was found to be 0.70 m$^2$/g.

Furthermore, the surface of secondary particle of this composite oxide was subjected to compositional analysis by X-ray photoelectron spectroscopy (XPS) (X-ray photoelectron spectrophotometer "ESCA-5500MC" manufactured by Physical Electronics; X-ray source, AlK$_\alpha$; analysis area, 0.8 mm in diameter; takeout angle, 45 degrees). As a result, the atomic ratio of boron (B/ (Ni+Mn+Co)) in the surface of the secondary particle was found to be 32 times the atomic ratio of boron in the whole secondary particle.

The lithium-nickel-manganese composite oxide obtained was used to fabricate a lithium secondary battery, which was evaluated. The results are shown in Table 1.

Example 2

A single-phase lithium-nickel-manganese composite oxide was obtained in the same manner as in Example 1, except that LiOH.H$_2$O, NiO, Mn$_2$O$_3$, Co (OH)$_2$, and Bi$_2$O$_3$ were used as raw materials in such proportions as to result in Li:Ni:Mn:Co:Bi=1.05:0.65:0.15:0.20:0.020 (molar ratio).

This composite oxide was examined for various properties in the same manner as in Example 1. As a result, the particles were found to have a powder packing density (tap density) of 1.90 g/cc and a BET specific surface area of 0.60 m$^2$/g. The atomic ratio of bismuth (Bi/(Ni+Mn+Co)) in the surface of the secondary particle was found to be 9 times the atomic ratio of bismuth in the whole secondary particle.

The lithium-nickel-manganese composite oxide obtained was used to fabricate a lithium secondary battery, which was evaluated. The results are shown in Table 1.

Comparative Example 1

A lithium-nickel-manganese composite oxide was obtained in the same manner as in Example 1, except that boric acid was not added. From an X-ray powder diffraction pattern, the lithium-nickel-manganese composite oxide obtained was ascertained to have a single-phase lamellar structure.

This composite oxide was examined for various properties in the same manner as in Example 1. As a result, the particles were found to have a powder packing density (tap density) of 1.73 g/cc and a BET specific surface area of 0.69 m$^2$/g.

The lithium-nickel-manganese composite oxide obtained was used to fabricate a lithium secondary battery, which was evaluated. The results are shown in Table 1.

Example 3

A single-phase lithium-nickel-manganese composite oxide was obtained in the same manner as in Example 1, except that LiOH.H$_2$0, NiO, Mn$_2$O$_3$, Co (OH) 2, and Bi$_2$O$_3$ were used as raw materials in such proportions as to result in Li:Ni:Mn:Co:B=1.05:0.33:0.33:0.33:0.005 (molar ratio), and that the maximum temperature in the burning was changed to 900° C.

This composite oxide was examined for various properties in the same manner as in Example 1. As a result, the particles were found to have a powder packing density (tap density) of 1.70 g/cc and a BET specific surface area of 0.80 m$^2$/g. The atomic ratio of bismuth (Bi/(Ni+Mn+Co)) in the surface of the secondary particle was found to be 44 times the atomic ratio of bismuth in the whole secondary particle.

The lithium-nickel-manganese composite oxide obtained was used to fabricate a lithium secondary battery, which was evaluated. The results are shown in Table 1.

Comparative Example 2

A lithium-nickel-manganese composite oxide was obtained in the same manner as in Example 3, except that bismuth was not added. From an X-ray powder diffraction pattern, the lithium-nickel-manganese composite oxide obtained was ascertained to have a single-phase lamellar structure.

This composite oxide was examined for various properties in the same manner as in Example 1. As a result, the particles were found to have a powder packing density (tap density) of 1.01 g/cc and a BET specific surface area of 2.27 m$^2$/g.

The lithium-nickel-manganese composite oxide obtained was used to fabricate a lithium secondary battery, which was evaluated. The results are shown in Table 1.

Reference Example 1

A lithium-nickel-cobalt-aluminum composite oxide was obtained in the same manner as in Example 1, except that LiOH.H$_2$O, NiO, Co(OH)$_2$, Al$_2$O$_3$, and H$_3$BO$_3$ were used in such proportions as to result in Li:Ni:Co:Al:B=1.05:0.82: 0.15:0.03:0.01 (molar ratio). From an X-ray powder diffraction pattern, the powder obtained was ascertained to have a single-phase lamellar structure.

This composite oxide was examined for powder packing density (tap density) in the same manner as in Example 1. As a result, the tap density thereof was found to be 1.62 g/cc.

Reference Example 2

A lithium-nickel-cobalt-aluminum composite oxide was obtained in the same manner as in Reference Example 1, except that boron was not added. From an X-ray powder diffraction pattern, the powder obtained was ascertained to have a single-phase lamellar structure.

This composite oxide was examined for powder packing density (tap density) in the same manner as in Example 1. As a result, the tap density thereof was found to be 1.77 g/cc.

TABLE 1

| | Composition of positive-electrode material | b/a | Tap density (g/cm³) | Specific surface area (m²/g) | *1 |
|---|---|---|---|---|---|
| Example 1 | $Li_{1.05}Ni_{0.65}Mn_{0.15}Co_{0.20}B_{0.01}O_2$ | 0.2 | 1.89 | 0.70 | 32 |
| Example 2 | $Li_{1.05}Ni_{0.65}Mn_{0.15}Co_{0.20}Bi_{0.02}O_2$ | 0.4 | 1.90 | 0.64 | 9 |
| Comparative Example 1 | $Li_{1.05}Ni_{0.65}Mn_{0.15}Co_{0.20}O_2$ | 0 | 1.73 | 0.69 | — |
| Example 3 | $Li_{1.05}Ni_{0.33}Mn_{0.33}Co_{0.33}Bi_{0.005}O_2$ | 0.1 | 1.70 | 0.85 | 44 |
| Comparative Example 2 | $Li_{1.05}Ni_{0.33}Mn_{0.33}Co_{0.33}O_2$ | 0 | 1.01 | 2.27 | — |
| Reference Example 1 | $Li_{1.05}Ni_{0.82}Co_{0.15}Al_{0.03}Bi_{0.01}O_2$ | 0.2 | 1.62 | | |
| Reference Example 2 | $Li_{1.05}Ni_{0.82}Co_{0.15}Al_{0.03}O_2$ | 0 | 1.77 | | |

| | Initial charge/discharge efficiency E (%) | Cycle capacity retention P (%) | Room-temperature resistance Before cycle test R1 (Ω) | Room-temperature resistance After cycle test R2 (Ω) | Change ratio (R2/R1) |
|---|---|---|---|---|---|
| Example 1 | 87.0 | 87.6 | 14.6 | 21.3 | 1.45 |
| Example 2 | 88.9 | 87.2 | 13.7 | 17.1 | 1.25 |
| Comparative Example 1 | 84.8 | 87.9 | 19.0 | 40.8 | 2.15 |
| Example 3 | 89.7 | 81.4 | 16.3 | 16.4 | 1.01 |
| Comparative Example 2 | 90.0 | 86.7 | 12.2 | 14.9 | 1.22 |

*1: Proportion of the atomic ratio of the sum of boron and bismuth to the sum of the metallic elements other than lithium, boron, and bismuth in surface part of secondary particle to the atomic ratio in the whole secondary particle.

A comparison of Examples 1 and 2 with Comparative Example 1 in Table 1 shows the following. The lithium-nickel-manganese composite oxides of the invention, in which boron or bismuth is present in the surface of the secondary particle in a high concentration which is from 5 times to 70 times the concentration thereof in the positive-electrode active material composition, have a higher tap density and attain a lower change ratio with respect to the change in coin cell room-temperature resistance through the 100-cycle charge/discharge test at 60° C. than the lithium-nickel-manganese composite oxide which contains neither boron nor bismuth and has the same composition with respect to the proportions of the other metals.

The composite oxides of Examples 1 and 2 are thus found to be advantageous when used as a positive-electrode material for lithium secondary battery. A comparison between Example 3 and Comparative Example 2 shows that the composite oxide of Example 3 likewise has a higher tap density and attains a lower change ratio with respect to the change in coin cell room-temperature resistance through the 100-cycle charge/discharge test at 60° C. It can be seen that in compositions having high manganese content as in Example 3, a high bulk density could be realized by causing boron and/or bismuth to be present in the surface of the secondary particle in a higher concentration from 5 to 70 times the concentration thereof in the positive-electrode active material composition.

This could be attained even in the composition of Comparative Example 3, which had an exceedingly low bulk density. It can be seen that in compositions having high nickel content as in the Reference Examples, the effects of the invention are low.

It was ascertained from Table 1 that the lithium-nickel-manganese composite oxides obtained in the Examples have a high powder tap density and a small specific surface area and give a secondary battery having excellent battery performances.

While the invention has been described in detail and with reference to specific embodiments thereof, it will be apparent to one skilled in the art that various changes and modifications can be made therein without departing from the spirit and scope thereof.

This application is based on a Japanese patent application filed on Mar. 28, 2002 (Application No. 2002-091473), the contents thereof being herein incorporated by reference.

INDUSTRIAL APPLICABILITY

According to the invention, a positive-electrode material for lithium secondary battery having high performances (high capacity, high cycle characteristics, high rate characteristics, high storability, etc.) which is suitable for use as a positive-electrode material for lithium secondary battery can be provided at low cost. In particular, a lithium/transition metal composite oxide having a higher bulk density than those, which have been synthesized hitherto, can be provided by the invention. Furthermore, the invention can provide a positive electrode for lithium secondary battery having high performances (high charge/discharge efficiency, low resistance and high output, etc.) and a lithium secondary battery.

The invention claimed is:

1. A positive-electrode material for a secondary lithium battery, which comprises:
   secondary particles of a lithium/transition metal composite oxide containing boron and/or bismuth, and wherein the atomic ratio of the sum of boron and bismuth to the sum of the metallic elements other than lithium, boron, and bismuth in surface portions of the secondary particles ranges from 8 times to 70 times the atomic ratio of the sum of boron and bismuth to the sum of the metallic elements other than lithium, boron, and bismuth throughout the entirety of each of the secondary particles, and wherein the lithium/transition metal composite oxide has a lamellar crystal structure and is represented by the following formula (3):

$$Li_xNi_\alpha Mn_\beta Q_{(1-\alpha-\beta)}Bi_v B_w O_2 \quad (3)$$

wherein Q represents at least one element selected from the group consisting of Al, Fe, Ga, Sn, V, Cr, Co, Cu, Zn, Mg, Ti, Ge, Nb, Ta, Zr, and Ca; and x, α, β, v, and w respectively represent numbers satisfying the relationships $0<x\leq 1.2$, $0.7\leq \alpha/\beta \leq 9$, $0\leq (1-\alpha-\beta)\leq 0.5$, $0\leq v\leq 0.1$ and $0\leq w\leq 0.1$ (provided that at least one of v and w is not 0).

2. The positive-electrode material for the secondary lithium battery according to claim 1, wherein the atomic ratio of the sum of boron and bismuth to the sum of the metallic elements other than lithium, boron, and bismuth in the surface portions of the secondary particles ranges from 8 times to 60 times the atomic ratio of the sum of boron and bismuth to the sum of the metallic elements other than lithium, boron, and bismuth throughout the entirety of each of the secondary particles.

3. The positive-electrode material for the secondary lithium battery according to claim 1, wherein the lithium/transition metal composite oxide containing boron and/or bismuth contains excess lithium based on the stoichiometric proportion thereof in the lithium/transition metal composite oxide, and wherein the atomic ratio (b/a) between the excess lithium based on the stoichiometric proportion (a) and the sum of boron and bismuth (b) ranges from 0.1 to 5.

4. The positive-electrode material for the secondary lithium battery according to claim 1, wherein α satisfies $0.3\leq \alpha \leq 0.8$.

5. The positive-electrode material for the secondary lithium battery according to claim 1 or 4, wherein β satisfies $0.05\leq \beta \leq 0.6$.

6. The positive-electrode material for the secondary lithium battery according to claim 1, wherein the secondary particle of a lithium/transition metal composite oxide containing boron and/or bismuth has a specific surface area of from 0.1 $m^2$/g to 8 $m^2$/g.

7. The positive-electrode material for the secondary lithium battery according to claim 1, wherein the secondary particles of a lithium/transition metal composite oxide containing boron and/or bismuth has a tap density of ranging from 0.8 $g/cm^3$ to 3.0 $g/cm^3$.

8. The positive-electrode material for the secondary lithium battery according to claim 1, wherein the secondary particles of a lithium/transition metal composite oxide containing boron and/or bismuth has an average particle diameter ranging from 1 μm to 50 μm.

9. A positive electrode for a secondary lithium battery, which comprises the positive-electrode material for a secondary lithium battery according to claim 1 and a binder.

10. A secondary lithium battery, which comprises the positive electrode for a secondary lithium battery according to claim 9, a negative electrode, and an electrolyte.

11. A process for producing the positive-electrode material for the secondary lithium battery according to claim 1, wherein a raw-material mixture which comprises water and compounds containing the metallic elements to be components of the target lithium/transition metal composite oxide and further containing boron and/or bismuth is formed into particles by a spray-drying method, and this molding is burned at a temperature higher than the melting points of the boron compound and bismuth compound used as raw materials to thereby yield secondary particle of the lithium/transition metal composite oxide containing boron and/or bismuth.

12. The process for producing a positive-electrode material for a secondary lithium battery according to claim 11, wherein the burning is conducted in an atmosphere having an oxygen concentration ranging from 10 to 80% by volume.

13. The process for producing a positive-electrode material for a secondary lithium secondary battery according to claim 11 or 12, wherein the boron source comprises at least one member selected from the group consisting of boric acid, boron, boron halides, boron carbide, boron nitride, boron oxide, organic complexes of boron halides, organoboron compounds, alkylboric acids, and boranes.

14. The process for producing a positive-electrode material for a secondary lithium battery according to claim 11 or 12, wherein the bismuth source comprises at least one member selected from the group consisting of bismuth metal, bismuth oxides, bismuth halides, bismuth carbide, bismuth nitride, bismuth hydroxide, bismuth chalcogenides, bismuth sulfate, bismuth nitrate, and organobismuth compounds.

15. The positive-electrode material for the secondary lithium battery according to claim 1, wherein the secondary particles are comprised of primary particles having an average particle diameter of 0.01 μm to 10 μm.

16. The positive-electrode material for the secondary lithium battery according to claim 1, wherein v>0.

17. The positive-electrode material for the secondary lithium battery according to claim 1, wherein w>0.

18. The positive-electrode material for a secondary lithium battery according to claim 1, which is produced by a process wherein a raw-material mixture which comprises water and compounds containing the metallic elements to be components of the target lithium/transition metal composite oxide and further containing boron and/or bismuth is formed into particles by a spray-drying method, and this molding is burned at a temperature higher than the melting points of the boron compound and bismuth compound used as raw materials to thereby yield secondary particle of the lithium/transition metal composite oxide containing boron and/or bismuth.

* * * * *